US00RE35163E

United States Patent [19]

Christensen et al.

[11] E Patent Number: Re. 35,163

[45] Reissued Date of Patent: Feb. 27, 1996

[54] WATER-WETTABLE DRILLING MUD ADDITIVES CONTAINING UINTAITE

[75] Inventors: K. Clark Christensen, Centerville, Utah; Neal Davis, II, Katy, Tex.; Michael Nuzzolo, Bountiful, Utah

[73] Assignee: American Gilsonite Company, Salt Lake City, Utah

[21] Appl. No.: 993,290

[22] Filed: Dec. 18, 1992

Related U.S. Patent Documents

Reissue of:

[64] Patent No.: 5,030,365
Issued: Jul. 9, 1991
Appl. No.: 315,017
Filed: Feb. 24, 1989

[51] Int. Cl.[6] ..... C09K 7/06

[52] U.S. Cl. ..... 507/107; 507/136; 507/118; 507/126

[58] Field of Search ..... 507/126, 136, 507/107

[56] References Cited

U.S. PATENT DOCUMENTS

| | | | |
|---|---|---|---|
| 2,597,085 | 5/1952 | Larsen | 252/8.5 |
| 3,314,489 | 4/1967 | Humphrey | 175/59 |
| 3,322,668 | 5/1967 | Fontenot et al. | 252/8.5 |
| 3,385,789 | 5/1968 | King | 252/8.5 |
| 3,528,914 | 9/1970 | Darley | 252/8.5 |
| 3,639,233 | 2/1972 | Schultz et al. | 252/8.5 M |
| 3,718,585 | 2/1973 | Lummus et al. | 252/8.5 C |
| 3,723,311 | 3/1973 | Lummus et al. | 252/8.5 A |
| 3,788,406 | 1/1974 | Messenger | 175/72 |
| 4,385,999 | 5/1983 | McCrary | 252/8.5 C |
| 4,404,108 | 9/1983 | Cates | 252/8.5 A |
| 4,420,405 | 12/1983 | McCrary | 252/8.5 A |
| 4,645,609 | 2/1987 | Patel | 252/8.51 |

FOREIGN PATENT DOCUMENTS

| | | | |
|---|---|---|---|
| 972141 | 8/1975 | Canada | 31/25 |

OTHER PUBLICATIONS

Davis II et al., "New Laboratory Tests Evaluate the Effectiveness of Gilsonite as a Borehole Stabilizer," IADC/SPE 17203 (1988) pp. 235–246.

Cagle et al., "Gilsonite stabilizes sloughing shales," *The Oil and Gas Journal*, Mar. 27, 1972, pp. 61–64.

Simpson et al., "Downhole Simulation Cell Shows Unexpected Effects of Shale Hydration on Borehole Wall," *IADC/SPE 17202* (1988) pp. 223–234.

*Primary Examiner*—Gary Geist
*Attorney, Agent, or Firm*—Townsend and Townsend Khourie and Crew

[57] ABSTRACT

A water-based drilling mud additive comprising a preblended combination of about 2 parts of high softening point uintaite, about 1 part of a lower softening point uintaite, about 1 part of causticized lignite, and a strongly lipophilic, non-ionic surfactant is disclosed. This composition decreases shale sloughing and bore-hole instability during drilling of wells.

66 Claims, No Drawings

WATER-WETTABLE DRILLING MUD ADDITIVES CONTAINING UINTAITE

Matter enclosed in heavy brackets [ ] appears in the original patent but forms no part of this reissue specification; matter printed in italics indicates the additions made by reissue.

FIELD OF THE INVENTION

This invention relates to a new composition of matter which is useful in water-based drilling fluids. More particularly, this invention relates to a drilling mud additive composition comprising two uintaites of different softening points, causticized lignite and a highly lipophilic non-ionic surfactant.

BACKGROUND OF THE INVENTION

Uintaite is a naturally occurring hydrocarbon mineral classified as an asphaltite. It is a natural product whose chemical and physical properties vary and depend strongly on the uintaite source. Uintaite has also been called 'gilsonite' although this usage is incorrect; Gilsonite® is a registered trademark of American Gilsonite Co., Salt Lake City, Utah. American Gilsonite Co sells a variety of Gilsonite® 'resins', sometimes identified by their softening points (ring and ball). For example, General Purpose (GP) Gilsonite® brand resin has a softening point of about 350° F, and Gilsonite® HM has a softening point of about 380° F, and Gilsonite® Select 300 and Select 325 which have softening points of about 300 and 325° F, respectively. The softening points of these natural uintaites depend primarily on the source vein that is mined when the mineral is produced. Uintaite is described in the Kirk-Othmer Encyclopedia of Chemical Technology, 3rd Ed. Vol. 11, 198C, pp. 802–806, which is incorporated herein by reference. Typical uintaite used in drilling fluids is mined from an area around Bonanza, Utah and has a specific gravity of 1.05 with a softening point ranging from 370° F to 400° F, although a lower softening point (330° F) material is sometimes used. It has a low acid value, a zero iodine number, and is soluble or partially soluble in aromatic and aliphatic hydrocarbons, respectively. It is generally processed and ground to where 99% passes through a 65-mesh Tyler screen with approximately 3% being retained on a 100-mesh screen and 16% on a 200-mesh screen, non-cumulative.

For many years uintaite and other asphaltic-type products have been used in water-based drilling fluids as additives assisting in borehole stabilization. These additives can minimize hole collapse in formations containing water-sensitive, sloughing shales. See, for example, SPE Paper 17203 (1988) to Davis and Tooman which is incorporated herein by reference in its entirety.

The causes of borehole instability are numerous. They can be mechanical, chemical, or physical in nature. Mechanical problems include borehole erosion by high annular velocities, adverse hydraulic stresses due to high annular pressures, hole collapse from high swab and surge pressures due to excessive wall cake, and stressed erosion due to drill string movement. Chemical alteration problems include hydration, dispersion, and disintegration of shales due to the interaction of clays with mud filtrate.

Physical instability problems include the spalling and rock bunts of shales due to in-situ rock stress and the difference between mud hydrostatic and formation pressures. Fracture and slippage along bedding planes of hard, brittle shales, and the collapse of fractured shales above deviated holes are also physical problems encountered while drilling troublesome shales.

Borehole instability problems are often referred to as sloughing, heaving, spalling, or overpressured shales, mud balls, mud rings, and many other descriptive names. There are many solutions to this problem. For example, additives have been used to inhibit or partially inhibit the swelling of clay. The adjustment of hydraulic conditions is another solution to reduce mechanical alteration. Knowing and controlling the pore pressure of the problem formations is used often.

Uintaite and asphalt-type materials have teen used for many years to stabilize sloughing shales and to reduce borehole erosion. Other benefits derived from these products include borehole lubrication and reduction in filtration. Numerous patents and publications disclose drilling mud additives containing uintaite.

Canadian Patent 972,141 to Sullivan discloses a well drilling fluid containing ground particles of uintaite (gilsonite) pre-coated with a non-ionic surfactant to make the particles water-wettable. Preferred surfactants are phosphate esters-derived from the group consisting of polyoxyethylene ethers of organic compounds containing at least 6 carbon atoms and having a reactive hydrogen and condensed with at least 3 mols of ethylene oxide. A process for using this composition in well drilling operation is also disclosed.

U.S. Pat. No. 4,645,609 to Patel discloses mixtures of causticized lignite and sulfonated asphalts, including uintaite (gilsonite), as well-working fluids. U.S. Pat. No. 4,420,405 to McCrary discloses compositions and their methods of preparation comprising uintaite (gilsonite), lignite, tannin and a sulfonating compound, preferably sodium sulfite, as drilling mud additives.

U.S. Pat. No. 3,718,585 to Lummus et al. discloses an aqueous drilling fluid consisting of uintaite (gilsonite), a stabilizing agent and an alcohol. The stabilizing agent is a particular ethoxylated alkylphenol or a polypropylene glycol (Mw between 1700 and 3500) reacted with 8 to 13 wt. % ethylene oxide. The stabilizing agent is prehydrated to assist in dissolution and to prevent gum formation.

Although the above-described patents teach many improvements, a number of problems still exist when using uintaite-containing drilling fluid additives. Of particular importance is that no one additive is useful for the entire range of temperatures and pressures downhole.

Also, uintaite is not easily water wet with most surfactants. Thus, stable dispersions of uintaite are often difficult to achieve, particularly in the presence of salts, calcium, solids and other drilling fluid contaminants and/or in the presence of diesel oil. The uintaite must be readily dispersible and must remain water wet; otherwise it will coalesce and be separated from the drilling fluid, along with cuttings at the shale shaker or in the circulating pits.

Surfactants and emulsifiers are often used with uintaite drilling mud additives. Surfactant-coated uintaite powders are also known. However, the surfactant of the surfactant-coated uintaite powders can lose its effectiveness over time, thereby causing stickiness or aggloxeration of the uintaite particles. Alternatively, the surfactant may evaporate leaving unwettable uintaite. Ideally the surfactant-coated uintaite should be storage stable for extended periods of time, without deterioration of performance.

Another serious problem with drilling mud additives is that they can be very sensitive to diesel fuel addition or contamination, resulting in kickout of the additive. Diesel kickout results in loss of the additive or the collecting screens.

Borehole stability tests of uintaite and other asphaltic-type additives have been conducted at ambient temperatures and pressures for many years. However, prediction of additive performance under downhole conditions has been unreliable. Borehole temperatures can vary from ambient up to 500° F and pressures can vary from atmospheric up to 25,000 psi. Only recently have tests beer devised under simulated downhole conditions. The Downhole Simulation Cell (DSC) described in the SPE Paper 17202 by Simpson, Dearing, and Salisbury is one example of these new tests. Another is described in the paper of Davis & Tooman, SPE Paper 17203 which used a High Pressure/Hi9h Temperature Fluid Loss cell and Berea cores to determine the depth of intrusion of drilling mud additives into the Berea core. This paper compared commercially available uintaite and asphaltic additives under downhole conditions. Using these new test procedures, we have now developed additives with significantly improved performance.

It would be advantageous if a uintaite drilling mud additive composition could be provided that was water-wettable and could be rewet rapidly, that would be effective over a wide range of temperatures and pressures, that would have improved stability to diesel fuel contaminants in drilling wells, and that would be storage stable, maintaining rapid wettability over time.

It would be advantageous if a single uintaite drilling mud additive composition could be provided that was effective in preventing shale sloughing and minimizing borehole instability over a broad range of temperatures, such as those encountered from spud to total depth (TD), and did not require surfactant addition at the drill site.

One object of the present invention is to provide a composition that is useful in water-based drilling fluids to prevent shale sloughing.

Further objects of the invention will become evident to those skilled in the art by reading the following specification, including the examples and the claims.

SUMMARY OF THE INVENTION

The present invention is a composition useful in water-based drilling fluids. In one embodiment the composition is a water-wettable drilling mud additive that stabilizes a borehole during well drilling, comprising a pre-blended stabilizing combination of a high softening point uintaite, a lower softening point uintaite, causticized lignite, and a strongly lipophilic non-ionic surfactant.

In a preferred embodiment, the composition comprises a mixture of:

a) 45 to 55 percent of a uintaite having a softening point of about 375° F.;

b) 20 to 30 percent of a uintaite having a softening point of about 325° F.;

c) 20 to 30 percent of causticized lignite; and d) 2 to 4 percent a non-ionic surfactant which comprises a block copolymer of ethylene oxide and propylene oxide, and provides a rewetting index of less than about 2 to the uintaites.

In another aspect, the present invention is a method of stabilizing an oil well to shale sloughing using the instant drilling fluid additive composition. In another embodiment, the invention is a method of drilling a well, comprising the steps of inserting a drill bit into the well and circulating a drilling mud comprising the additive described above.

Among other factors we have unexpectedly found that a composition comprising a mixture of two different uintaites, one of which has a softening point above about 325° F and the other having a softening point of about 375° F, causticized lignite and a highly lipophilic surfactant-when combined in the proper ratio-produces a water-wettable drilling mud additive that stays water wettable and is extremely effective over a wide range of wellbore temperatures.

DETAILED DESCRIPTION OF THE PREFERRED EMBODIMENTS OF THE INVENTION

We have now discovered a uintaite-containing drilling mud additive that is particularly effective in minimizing borehole enlargement and controlling sloughing shale problems over a wide temperature range. This composition is a unique combination or mixture of a strongly lipophilic non-ionic surfactant, causticized lignite and at least two uintaites having different softening points. We have found that an additive comprising this combination in effective stabilizing amounts results in significantly improved performance over a wide range of well temperatures, such as from ambient temperatures to 250° F and higher. Typically, these additives may be used at temperatures up to about 400° F.

Using a mixture of uintaites having softening points at least 40° F apart or more, preferably about 50° F apart, is critical to this invention. We have discovered that this mixture of uintaites increases the range of temperatures over which the additive is useful. Additionally, we have found that inclusion of causticized lignite is necessary for good performance at high temperatures, such as 250° F. Moreover, the surfactants described below are critical to dispersing the uintaites into the drilling mud and keeping them wetted.

In one aspect, our invention is a water-wettable drilling mud additive that stabilizes a borehole during well drilling, comprising a pre-blended borehole stabilizing combination of a high softening point uintaite, a low softening point uintaite, causticized lignite, and a strongly lipophilic non-ionic surfactant. The surfactant provides the uintaite with a rewetting index of less than about 4, preferably less than about 2.

In a preferred embodiment, the water-wettable drilling mud additive of our invention comprises a mixture of:

a) 45 to 55 percent of a uintaite having a softening point of about 375° F.;

20 to 30 percent of a uintaite having a softening point of about 325° F.;

c) 20 to 30 percent of causticized lignite; and d) 1 to 5 percent a non-ionic surfactant which comprises a block copolymer of ethylene oxide and propylene oxide, and provides a wetting index of less than about 2 to the uintaites.

The additive of this invention is a pre-blended mixture, that is, it is a single, solid component that is already pre-mixed when sold for use downhole. It does not require additional surfactants and emulsifiers at the drill site. The additive composition of the invention can stabilize a borehole over the broad range of temperatures encountered in drilling wells.

Each of the components of this additive composition will now be described.

The Uintaite Components

Uintaite is a naturally occurring asphaltic hydrocarbon ore. Uintaites useful in this invention have a broad range of softening points, typically between 300 and 400° F. Uintaite is the preferred asphaltic material in this invention. However, it is contemplated that other asphaltic materials with softening points in this range could be effective; for example, blown asphalt may be used to replace some or all of the low softening point uintaite.

Softening points of uintaite generally depend on the source or vein where the uintaite is mined. Preferably, the high softening point uintaite has a softening point of at least 360° F., preferably 375° F., or higher. Preferred high softening point uintaite has a softening point of from about 370 to 390° F. Preferably, the lower or low softening point uintaite has a softening point of about 330° F, or lower. Preferred low softening point uintaite has a softening point of from 290–330° F., preferably about 325° F. The softening points of the two uintaites are preferably at least 40° F. apart, more preferably about 50° F. apart or more.

It is contemplated that upgraded uintaite could be used to replace or partially replace the low softening point uintaite. Uintaite can be upgraded by solvent extraction or precipitate to give lower softening point products.

Using high temperature, high pressure testing equipment, we have found that the low softening point uintaite is effective in minimizing borehole instability during the early stages of the well where lower temperatures, typically up to about 125°–175° F., are encountered. We have surprisingly found that at least about 20% of this low softening point uintaite is necessary in the additive formulation to have good low temperature performance.

We have found that the high softening point uintaite is effective in minimizing borehole instability at higher well temperatures, such as 180°–250° F. and higher. However, we have also found that it is critical to combine causticized lignite with the uintaite mixture to obtain good high temperature results.

Preferred weight ratios of the high softening point uintaite to the lower or low softening point uintaite are in the range of 4:1 to 1:2, more preferably in the range of 3:1 to 1:1, and most preferably about 2:1.

In a preferred embodiment, the mixture of uintaites is made up of about a 2:1 mixture of Gilsonite® HM, having a softening point of about 380° F, and Gilsonite® Select, having a softening point of about 325° F. Preferably, the ratio of Gilsonite® HM to Gilsonite® Select to lignite is about 2 to about 1 to about 1.

The Causticized Lignite Component

Causticized lignite is well known in the art. It is prepared from lignite, which is a variety of coal intermediate between peat and bituminous coal, by reaction with base, such as sodium or potassium hydroxide. The lignite is causticized, i.e., reacted with base, because the causticized material is readily water-soluble. Causticized lignite is commercially available and can be prepared in a manner known in the art. Suitable methods of causticizing lignite include those disclosed in U.S. Pat. No. 3,441,504 to Browning and U.S. Pat. No. 4,645,609 to Patel, the disclosures of which are hereby incorporated by reference. A preferred lignite that may be causticized and used in this invention has an oxygen content of at least about 20 weight percent, usually in the range of from about 20 to about 40 weight percent, measured on a dry basis. Lignitic materials which are high in humic acids, thus readily soluble in basic solution, are most preferred. Presently preferred is Leonardite, which is characterized by its high oxygen content and increased alkali solubility. Leonardite is a soft, earthy, medium brown, coal-like substance associated with lignitic outcrops in North Dakota, South Dakota, Montana and Texas, and is mined commercially. Normal lignite may be converted to a material of similar properties to Leonardite by oxidation; such converted lignite may be used to prepare compositions of this invention. Leonardite has an oxygen content higher than other types of lignite, generally about 28–29 percent oxygen, compared to 10 percent in lignite. This higher oxygen content is due to the larger number of carboxylic acid groups, which may explain the improved in alkali solubility of Leonardite as compared to other lignites. Typical solubility of conventional lignite is about 68 weight percent in alkali, whereas Leonardite has a solubility of about 85 weight percent.

Causticized lignite is a component of many drilling muds. However, our experiments indicate that the causticized lignite must be pre-blended into the additive to achieve good high temperature (e.g., 250° F) borehole stabilization and improve the disperability of uintaite. It is advantageous to uniformly blend the lignite into the additive composition.

The causticized lignite used in this invention is a solid. The weight ratio of uintaites to causticized lignite in the instant pre-blended additive is preferably within the range of about 4:1 to 2:1, preferably about 3:1. The amount of lignite is preferably about equal to the amount of low softening point uintaite. The amount of lignite is also preferably about equal to twice the amount of high softening point uintaite. Most preferably, the ratio of high softening point uintaite to low softening point uintaite to lignite is 2 to 1 to 1.

The Surfactant Component

It is advantageous that uintaite be pretreated with surfactant prior to addition to the drilling mud system. This results in the uintaite being more completely water-wet, and therefore more evenly dispersed throughout the circulating system. The additive is in a more convenient and easier to use form.

The surfactant component of this invention is also critical. The surfactant must impart properties to the uintaite that result in a drilling mud additive that is effective in bore-hole stabilization over a wide temperature range.

The surfactant-treated or surfactant-coated uintaites useful in this invention must meet the following three wetting criteria. They must have:

a) rapid initial wettability;

b) good rewettability after soaking in water; and c) good wettability after storage for at least 30 days at 110° F., i.e., they must be storage stable.

Additionally, the surfactant must perform well when mixed with drilling mud chemicals. Preferably, the surfactant should also have a flash point above 300° F. in order to avoid the possibility of ignition, and a pour point below 32° F. for ease of application to the uintaite. Preferably, the surfactant-treated uintaites should show good diesel resistance, i.e., they should not coalesce in the presence of 3% diesel.

These properties of the surfactant-treated uintaite are all dependent on the surfactant chosen. Tests for these properties are described in the examples.

Uintaite is not water-wettable. Loose or poor bonding of the surfactant to the uintaite will lead to its washing off during use, possible agglomeration, and the removal of uintaite from the mud system with the drilling wastes. Thus, the importance of the wettability, rewettability, and storage stability criteria is evident. It is especially important to choose a surfactant that bonds or complexes tightly with the uintaites, but does not dissolve, soften or make the uintaite sticky as the resulting-additive should be free-flowing. Moreover, the surfactant should not interact deleteriously with the causticized lignite, for example by hindering its dissolution.

We have now discovered that the surfactant-treated uintaite useful in this invention must have a Rewetting Index (RI) of less than about 4, preferably less than about 2, and most preferably about one. Useful surfactants must provide or impart this rewetting index to the uintaite. The RI is a good predictor of continuing uintaite dispersability during use in drilling.

The RI is determined by measuring the time it (initially) takes to wet a surfactant-treated sample of uintaite and the time it takes to rewet the sample after stirring with water and drying; Examples 2 and 4, below, discuss the details of how these tests are performed. The RI is the ratio of the rewetting time to the initial wetting time, i.e., $$\text{Rewetting Index } (RI) = \frac{\text{Rewetting Time}}{\text{Initial Wetting Time}}$$

Surfactants useful in this invention generally provide the uintaite with initial wetting times that are less than about 10 seconds and rewetting times that are less than about 4 times the initial wetting times, and therefore are less than about 40 seconds. More preferably, the ratio of the rewetting time to the initial wetting time is less than about 2 and most preferably about 1.

Surfactant-treated uintaites that do not meet the RI criteria of less than about 4 tend to have surfactants that come off the uintaite in water. These surfactants wash off the uintaite in the hot circulating drilling mud, resulting in loss of the uintaite from the mud system through separation and lack of redispersion.

Preferred surfactants are highly lipophilic non-ionic surfactants. By the term 'highly lipophilic' surfactant is meant a surfactant that has a strong affinity for a hydrocarbon phase, rather than water. In these surfactants, the relative contribution of the non-polar lipophilic tail to the polar hydrophilic head is high. Preferred surfactants have at least 80% of their molecular weight in the hydro-phobic or lipophilic tail, preferably about 90% or more.

Broadly speaking, preferred surfactants useful in this invention have a hydrophile-lipophile balance (HLB) value below about 3, preferably as low as 1. Materials with low HLB values are especially useful in making water-in-oil emulsions. Surfactants with HLB values of 1–4 generally have poor to no dispersibility in water. HLB values are described in 'Non-ionic Surfactants' (1967) edited by M. J. Schick, pp. 604–608, which is incorporated herein by reference, and in 'Surfactants in Solution', Vol. 3, edited by K. L. Mittal & B. Lindman (1984) pp. 1928–1930, which is also incorporated herein by reference. It appears from our experiments that the molecular weight of the surfactant is also important in providing low RI values.

Non-ionic surfactants having HLB values below about 3 include high molecular weight fatty alcohols, such as cholesterol and lanolin alcohols; ethoxylated polyoxypropylene glycols, such as Alkatronic PGP 33-1 and PGP 18-1; ethoxylated amines, such as those sold by Tomah Products Inc.; block copolymers of propylene oxide and ethylene oxide, such as those in the Tetronic series; and ethoxylated ethylene diamine polyoxypropylene compounds, such as Alkatronic EDP 38-1 and EDP 28-1. Mixtures of surfactants are also envisioned.

An especially preferred surfactant is Pluronic L-101 which is a non-ionic surfactant manufactured by BASF-Wyandotte. It is a block copolymer surfactant comprised of 10 wt. % ethylene oxide and 90 wt. % propylene oxide, and is terminated with the ethylene oxide groups and with primary hydroxyl groups. Pluronic L-101 has an HLB value of 1 and is strongly lipophilic. Its average molecular weight is about 3800, its viscosity is 800 cps at 25° C., and its pour point is −23° C.

We have compared Plutonic L-101 with its sister surfactants Pluronic L-61 and L-81 (see Table II below). These sister surfactants have similar structures to Pluronic L-101, i.e., they are block copolymer surfactants with 10 wt. % ethylene oxide and 90 wt. % propylene oxide. However, these sister surfactants have lower molecular weights, 2000 and 2700 respectively, and do not provide an RI of less than 4 to the uintaite. It appears that the RI is affected by surfactant molecular weight as well as HLB.

The Drilling Mud Additive Composition

In one aspect, the present invention is a pre-blended mixture of a high softening point uintaite, a low softening point uintaite, causticized lignite, and a surfactant that provides the uintaites with a rewetting index of less than about 4. This borehole stabilizing combination of components is combined in amounts or ratios such that the combination stabilizes the borehole at both low (ambient to 175° F.) and high (180–450° F., especially 180–350° F) borehole temperatures.

The drilling mud additive of this invention is a preblended, free-flowing solid or powder. Preferred amounts of the above described components in the additive are:

| Component | Preferred Range, % | Most Preferred Range, % |
|---|---|---|
| High softening point uintaite | 30–70 | 45–55 |
| Low softening point uintaite | 15–40 | 20–30 |
| Causticized lignite | 15–40 | 20–30 |
| Lipophilic surfactant | 0.1–10 | 1–5 |

wherein said percents are by weight. The surfactant is preferably applied evenly to the surface of the uintaite.

An especially preferred product comprises about 2 parts Gilsonite® HM, about 1 part Gilsonite® Select, about 1 part causticized lignite and about 0.1 to 0.15 parts of a non-ionic surfactant which imparts a rewetting index of less than about 2 to the uintaite; an especially preferred surfactant is Pluronic L-101.

Preparation of the Additive of this Invention

In one aspect, the present invention is a method of preparing a water-wettable drilling mud additive comprising the steps of: mixing together a high softening point uintaite solid and a low softening point uintaite solid, pulverizing said solids and adding causticized lignite and a strongly lipophilic surfactant. Preferably, the surfactant is a non-ionic surfactant that provides the uintaite with an RI of less than 4, preferably less than about 2.

In a preferred embodiment, the drilling mud additive composition of this invention can be prepared by mixing together the uintaite solids, pulverizing this mixture of solids, adding the causticized lignite and adding the surfactant. The lignite may be added prior to, during, or after the surfactant is added. It is advantageous to grind or pulverize the solids so that they are a fine powder, such as −200 mesh (Tyler sieves).

The surfactant is preferably added to this mixture by spraying, although other methods may be used. It is advantageous to evenly apply the surfactant to the surface of the uintaite so that wetting in use will be rapid and complete. Alternatively, the surfactant can the dissolved or trapped in the uintaite, for example, it can the combined with molten uintaite, which is then solidified and pulverized.

The causticized lignite can be added during pulverization and prior to addition of the surfactant; or it can be added after the surfactant is added; or both lignite and surfactant can be added simultaneously. It is preferred that the causticized lignite be added during pulverization and concurrent with the surfactant.

Preferably the uintaite powders are mixed at ambient temperatures and pressures, the pulverization is accomplished in an impact mill, and the surfactant is evenly distributed onto the solids, for example, by spraying. The resulting pre-blended additives do not require additional surfactants or emulsifiers when used in the field, although they can be used.

Using the Drilling Mud Additive

The additive of this invention can be used to decrease shale sloughing and borehole instability in any water-based drilling mud or drilling fluid. Preferably the additive is used in organic or polymer-based drilling muds. These drilling muds are commonly used in the industry and typically comprise mixtures of polymers, clays, weighting agents, organic thinners, salts, starches, other chemical treating agents, and sometimes diesel oil.

This additive is also especially useful with chrome lignosulfonate/lignite or polymer muds. These muds are well known in the art. Typical polymer components used in drilling muds include partially hydrolyzed polyacrylamides, polyanionic celluloses and polyacrylates to name a few. The additive can be added directly to the water-based drilling muds and may be dispersed without use of an emulsifier.

In one embodiment, this invention is a method of drilling a well, comprising the steps of inserting a drill bit into the well and circulating a drilling mud containing the additive of this invention as described above. The additive is useful over a broad range of temperatures from ambient to 400° F., preferably from ambient to 300° F. In use, application rates can range from 1 to 10 lbs. of this additive composition per barrel of drilling fluid, preferably 2 to 6 lbs. are used.

The additives of this invention stabilize sloughing shales and reduce borehole erosion. Other benefits include borehole lubrication and a reduction of high temperature/high pressure filtration.

Although not intended to be limited by any theory, it is believed that these additives minimize borehole instability due to physical alteration and, to some extent, chemical alteration. They help reduce sloughing shale problems by minimizing shale slippage along microfractures or bedding planes by physically sealing and plugging these cracks. Thus, it is believed that these additives when added to a mud system prior to encountering a problem shale, penetrate the shale pore spaces, microfractures, and bedding planes as the bit is penetrating the formation. By a plastic-flow mechanism, the uintaites extrude into the pores, fractures, and bedding planes to reduce or minimize filtrate and whole mud invasion, and thus bond the matrix to prevent sloughing. In addition, uintaite may plate out on the borehole wall, creating a thin film.

The combination of two, or more, uintaites having somewhat different plastic-flow properties results in a broader useful temperature range. The softening point of the uintaite, the temperature and the pressure all influence the depth of invasion of the uintaite. It is desirable to obtain some intrusion, but not a deep depth. The desirable depth of intrusion should be shallow, around one millimeter. The lower softening point uintaite plugs effectively with shallow intrusion (<1 mm) at lower temperatures (150° F.). At higher temperatures (300° F.), the lower temperature softening point uintaite intrudes deeper than the desirable depth while the higher softening point uintaite intrudes to the desirable depth. A blend of high temperature and low temperature softening point uintaites have tested to be effective over a broad range of temperatures (150°–300° F.).

The surfactant, which imparts a Rewetting Index of less than about 4, preferably less than about 2 to the uintaite is critical to keeping the uintaite water-wettable. These surfactants bind strongly to the uintaites and provide good surface wetting characteristics. Moreover, these surfactants stay bound to the uintaite even within the drilling mud, which contains water, large amounts of clays, contaminants, formation solids, weighting materials, chemical additives and diesel oil. Also, these surfactants appear to have a low affinity for rock, especially relative to their affinity for uintaite. It is believed that the surfactant and the causticized lignite are both needed to aid in dispersing the uintaite into the drilling mud.

The invention will be better understood in light of the following specific examples, which are merely illustrative and should not be construed as limiting the invention in any respect, as will be evident to those skilled in the art

EXAMPLES

EXAMPLE 1

Preparing Surfactant-Coated Uintaite A wide range of surfactants were tested for use in this invention. The surfactants were added to pulverize Gilsonite® HM brand uintaite by use of a v blender equipped with a liquid dispersion bar at room temperature, resulting in evenly-coated uintaite. The Gilsonite® HM was ground to meet Criteria A of Example 11. The weight percent surfactant was either 3 or 5% of the uintaite.

EXAMPLE 2

Dynamic Wettability Test-Initial Wetting

Two hundred (200) mi tap water at 77° F in a 400-ml beaker was stirred at full vortex with a 2-inch long magnetic bar. Three (3) grams of a surfactant-treated uintaite of Example 1 was added. Results were reported as the time (seconds) taken to wet the entire sample. The endpoint, at which the entire sample was wet, can be determined by visual inspection. When the uintaite was wet, its appearance changed. It darkened and was totally submerged in water. When the uintaite did not wet, the material continued to float on the surface. To pass this test, the time to complete wetting was 10 seconds or less. This 10-second criteria has been found to correlate well with good mixing and wetting performance in the field. Samples were generally run in duplicate, with results agreeing within 1–2 seconds.

EXAMPLE 3

Storage Stability Test

The surfactant-treated samples of Example 1 were tested using the procedure in Example 2. A second portion of these samples was stored at 110° F for 30 days in a brown paper lunch bag. The procedure of Example 2 was repeated on these stored samples. A wetting time of less than four times the original wetting time was considered a pass.

EXAMPLE 4

Rewetting Test

To 800 ml tap water at 77° F was added 20 grams of surfactant-treated uintaite of Example 1. This mixture was stirred at full vortex with a 2-inch long magnetic stir bar for 10 minutes, then poured through a 1.5-micron filter. The filtered solids were dried for 24 hours at 110° F. and passed through a 65-mesh screen. The dynamic wettability test of Example 2 was run on this water-treated uintaite sample. To pass this test, the wet ting time had to be less than four times the original wetting time, preferably the rewetting time was less than two times the original wetting time.

EXAMPLE 5

Preparation of a Base Mud

A base drilling mud was prepared by mixing 18.0 pounds/barrel bentonite clay, 0.5 pounds/barrel sodium hydroxide, 2.0 pounds/barrel chrome lignosulfonate in one barrel of distilled water. This base mud was used to test the diesel fuel resistance of the surfactant-treated uintaites.

EXAMPLE 6

Diesel Fuel Resistance of Additives

This test was used to determine diesel fuel resistance of various drilling mud additives. Three hundred fifty (350) milliliters of base mud of Example 5 was heated to 150° F. in a 800-milliliter beaker while stirring at 500 revolutions per minute using a 154-inch Kaufman dispersion blade. Six grams of the additive was added to the beaker while stirring. Stirring was continued for thirty minutes, at which time the below-indicated amount of diesel fuel was added with continuous stirring for an additional sixty minutes. The beaker was removed from stirring and allowed to cool, covered, for sixty minutes. The sample was reheated to 150° F. and stored for 60 minutes. The beaker was removed from heat and immediately poured through a 65-mesh Tyler sieve. The sieve was air dried, photographed and weighed to evaluate the amount of 65-mesh retains. Two commercially available uintaite additives, X and Y, were tested and compared with the additive of this invention.

TABLE I

| | Weight retained on Sieve[1] | |
|---|---|---|
| | 1% Diesel | 3% Diesel |
| Additive X | 7.8 | 13.4 |
| Additive Y | 7.7 | 11.9 |
| Gilsonite ® HM + Pluronic L-101 | 4.2 | 7.4 |
| Product from Example 10 | 3.9 | 4.9 |

TABLE I-continued

| | Weight retained on Sieve[1] | |
|---|---|---|
| | 1% Diesel | 3% Diesel |

[1]Weight in grams on Tyler 65-mesh sieve.

The lower the weight retained on the sieve, the less product was kicked out by the added diesel, and therefore, the better the additive. As can be seen, the additive of this invention had lower solids kicked out than other tested additives, including other commercially available mud additives containing uintaite, i.e., additives X and Y. The good diesel resistance of our additive is an advantage. For screening purposes, a visual inspection at 3% diesel was used. The surfactant-treated uintaites of Example 1 were mixed with the drilling mud at 150° F and stirred for ½ hour. Then 3 % diesel was added. Total separation in the presence of the added diesel was a failure.

EXAMPLE 7

Flash Point Measurement

Flash points were measured using ASTM Method D-92-78. The flash point of the surfactant needs to be >300° F., so that the pulverization of the additive components can be accomplished safely.

EXAMPLE 8

Softening Point of Uintaite

The softening point of the uintaites is measured by ASTM Method E-28-51T. It is a ring and ball softening point.

EXAMPLE 9

Results from Surfactant Testing Experiments

Surfactant-treated uintaites as prepared in Example 1 were tested using the tests described in Examples 2–7. The results are shown in Table II below. As can be seen, only Pluronic L-101 passed the Initial wetting, Rewetting, Storage Stability, Diesel Fuel Resistance, and the Flash Point above 300° F. tests. It was totally unexpected that Pluronic L-101 would bond so tenaciously to the pulverized uintaite, as evidenced by the Rewetting test; the rewetting index for this surfactant was 1.01. Even when the Pluronic L-101 treated uintaite was mixed with water for 24 hours and then dried, its rewettability was still excellent.

The surfactants tested include:

A=Pluronic L-101, a 10% ethylene oxide polyoxypropylene-polyoxyethylene block copolymer, MW TM 3800; BASF Wyandotte, New Jersey.

B=Morwit D-425; Petrochemical Co. Inc., Houston, Texas.

C=Daxad; W. R. Grace.

D=Reax 45A (Lignosulfonic acid); Westvaco, South Carolina.

E=Arsurf 906; Arjay Chem., Houston, Texas.

F=Arsurf 908; Arjay Chem., Houston, Texas.

G=Arsurf 910; Arjay Chem., Houston, Texas.

H=Arsurf 912; Arjay Chem., Houston, Texas.

I=Drilling Mud Surfactant; Sun Chemicals

J=Phase I; Sun Drill Fluids, Louisiana.

K TM Wyo Gils. Solv.; Wyo-Ben Company, Wyoming.

L TM Witcomul; Witco Corp., New York, New York.

M=Emcol 4500; Witco Corp, New York, New York.
N TM Witcomul; Witco Corp., New York, New York.
O=Coal Dust Retardent; Power Line Chem., Salt Lake City, Utah.
P=Cesco Coupler I; Cesco Corp., Lafayette, Louisiana.
Q=Cesco Coupler II; Cesco Corp., Lafayette, Louisiana.
R=Cesco Coupler II; Cesco Corp., Lafayette, Louisiana.
S=Pluronic L-81 a 10% ethylene oxide polyoxypropylene polyoxyethylene block copolymer, MW=2700;
BASF Wyandotte, New Jersey.
T=Pluronic L-61 a 10% ethylene oxide polyoxypropylene polyoxyethylene block copolymer, MW=2000;
BASF Wyandotte, New Jersey.
U=Rohm & Haas-30% solids, acrylic copolymer inn solvent; Rohm & Haas, Inc., Philadelphia, Pennsylvania.
V=Rohm & Haas-40% solids, acrylic copolymer in solvent; Rohm & Haas, Inc., Philadelphia, Pennsylvania.
W=Rohm & Haas-50% solids. acrylic copolymer in solvent; Rohm & Haas, Inc., Philadelphia, Pennsylvania.

TABLE II

| | | Screening Tests for Drilling Mud Surfactants[1] | | | |
|---|---|---|---|---|---|
| Surfactant | Amt. % | Dynamic Wettability[2], sec. | Storage Stability[3], sec. | Rewettability[4], sec. | Flash Pt., (5), °F. |
| None | — | Failed | | | |
| A | 3 | 7.8 | 4.8 | 7.9 | 460 |
| B | 5 | Failed | | | |
| C | 5 | Failed | | | |
| D | 5 | Failed | | | |
| E | 3 | *17.4 | | | |
| F | 3 | 3.4 | Failed | | |
| G | 3 | 2.8 | Failed | | |
| H | 3 | *11.0 | | | |
| I | 3 | Failed | | | |
| J | 3 | Failed | | | |
| K | 3 | Failed | | | |
| L | 3 | 7.2 | | | Failed |
| M | 3 | 8.2 | | | Failed |
| N | 3 | *29.5 | | | Failed |
| O | 3 | *48.0 | | | |
| P | 3 | 2.9 | Failed | | 300 |
| Q | 3 | 2.9 | *27.3 | Failed | 300 |
| R | 3 | 2.8 | 10.3 | Failed | 300 |
| S | 3 | 3.4 | Failed | | +400 |
| T | 3 | 3.1 | Failed | | +400 |
| U | 3 | 6.8 | Failed | | |
| V | 3 | 6.6 | Failed | | |
| W | 3 | 4.1 | Failed | | |

[1]*Indicates failure.
[2]See Example 2.
[3]See Example 3.
[4]See Example 4.
[5]See Example 7.

EXAMPLE 10

Preparing an Additive Composition of this Invention

An additive composition of this invention was prepared in the laboratory by combining 50% by weight Gilsonite® H.M. Pulverized (American Gilsonite Co.); 25% by weight Gilsonite® Selects 325 Pulverized (American Gilsonite Co.); and 25% by weight causticized lignite (Lenalk brand purchased from Georesources, Williston, North Dakota) to a total weight of 1500 grams. The three components were placed in a large V-shaped blender equipped with a liquid dispersion bar. The blender and dispersion bar were turned on and 46.4 grams (3%) BASF Pluronic L-101 was added through a liquid feed system. The blender was run for 30 minutes to allow for even coating of the uintaites and lignite mixture.

EXAMPLE 11

Large Scale Additive Preparation

An additive composition of this invention was prepared on a large scale. Ten (10) tons high softening point (375° F.) uintaite was pre-blended with 5 tons low softening point uintaite (325° F). The unitaite was then passed through a fluid bed vibrating dryer to remove any moisture, and conveyed to a storage bin. A second storage bin was filled with 5 tons of causticized lignite. Both bins had rotary feeders that simultaneously fed the components to a Pulvicron PC 38 (Bepex Corp.) pulverizer impact mill. RPM's of the feeders were adjusted to accomplish a three to one blending ratio (75% uintaite to 25% causticized lignite). The mill was run at 1750 rpm and the air classifier was run at 975 rpm. Adding Pluronic L-101 to the uintaite/lignite blend was done at the time of the blending and pulverization by pumping the Pluronic L-101 to the pulverizer where it was introduced into the mill. Temperatures in the mill were about 110° F. during operation. Flow rates were adjusted to achieve good wettability of the treated uintaite, and varied according to ambient and mill temperatures, which effect the viscosity of the surfactant and therefore its flow rate.

The mixture was milled to meet criteria A below; preferably criteria B was met. If sizing was too large, the large particles were recycled through the mill for further pulverization. This separation was done by air classification.

| % Retained on Tyler Mesh Sieves (Cumulative) | | | | |
|---|---|---|---|---|
| Criteria | 35 Mesh | 65 Mesh | 100 Mesh | 200 Mesh |
| A | Trace | 1% max | 3% max | 20% max |
| B | 0 | 0 | 1.0 max | 5–10% max |

Tests of the product were conducted per Example 2 to assure that product passed the weltability, test. The product dispersed in 2 seconds.

EXAMPLE 12

Additive Compatibility with Muds

An additive of the invention was tested in the four different types of water base drilling fluids shown below. The fluids selected were lime-KOH mud, KCl-polymer mud, seawater-polyanionic cellulose mud, and chrome lignosulfonate mud. All these fluids were unweighted. Six pounds per barrel of our additive was added to each of the fluids and mixed thoroughly. All samples were then allowed to stand overnight. In all cases the additives mixed easily and showed no sign of coalescence, i.e., there was no separation or clumping together of the uintaite.

| Mud Makeup | |
|---|---|
| KCl-Polymer | Seawater-Polyanionic Cellulose |
| 1 bbl deionized water<br>10.5 ppb KCl<br>0.5 ppb PHPA<br>0.5 ppb polyanionic cellulose<br>KOH to pH 9.0–9.5 | 1 bbl deionized water<br>14.7 gm sea salt<br>1 ppb lime<br>10 ppb attapulgite clay<br>0.25 ppb PHPA<br>0.5 ppb polyanionic cellulose<br>KOH to pH 9.0–9.5 |
| Chrome Lignosulfonate | KOH-Lime |
| 1 bbl deionized water<br>15 ppb bentonite clay<br>6 ppb chrome lignosulfonate<br>3 ppb lignite<br>2 ppb NaOH<br>pH 9.5–10.0 | 1 bbl deionized water<br>15 ppb bentonite clay<br>4 ppb KOH<br>8 ppb lignite<br>8 ppb calcium lignosulfonate<br>.25 ppb carboxymethyl cellulose<br>6 ppb lime<br>pH 11.5–12.5 |

ppb = lbs/barrel
PHPA = partially hydrolyzed polyacrylamide

EXAMPLE 13

HTHP Core Test

A high temperature/high pressure (HTHP) fluid loss cell/Berea core test provided data that could be used to discriminate between various additives. The procedure of this test is described in SPE Paper 17203 to Davis & Tooman, presented Feb. 28–Mar. 2, 1988, pp. 235–246. Additives were tested in a caustic water-based drilling mud. The tests indicate that temperature and pressure influence the depth of intrusion of different softening point uintaites. It is desirable to obtain some intrusion, but not a deep depth of intrusion, i.e., about 1 mm of intrusion. In addition, some intrusion of the material is necessary. (See page 243, Table #6, PE 17203.)

EXAMPLE 14

Downhole Simulation Test

Borehole stability was measured by the downhole simulation cell (DSC) described in SPE Paper 17202 to Simpson et al., presented Feb. 28–Mar. 2, 1988, pp. 223–233, which is incorporated herein by reference. Table III summarizes the results.

The DSC was used to test a series of uintaite blends to determine compositions that provide borehole stability. Blends of different Softening point uintaites and blends of uintaite and lignite were used. The criteria for borehole stability was borehole enlargement experienced in the test runs and measured on the shale core as described in SPE Paper 17202. The preferred result is a borehole size close to bit size and a low percentage of washout The results of these tests are shown in Table III. The additives tested are described below. The low softening point uintaite was Gilsonite® brand Select 325, which had a softening point of 325° F. The high softening point uintaite 30 was Gilsonite® HM, which had a softening point of 383° F. Causticized lignite was used. The additives were tested using the muds and the conditions described in SPE Paper 17202. The bit size for these tests was 1.25 inch.

A=A commercially available low softening point uintaite (~325° F) product that was used with a commercially available coupler, i.e., a uintaite-dispersing surfactant. This additive provided superior stability at 125° F. compared to a high softening point uintaite.

B=A 50/50 blend of low and high softening point uintaites used with a commercially available coupler. This mixture exhibited comparable results to low softening point uintaite at 125° F. At higher temperatures, this blend showed increasing washout.

C 50/50 blend of high softening point uintaite and lignite used with a commercially available coupler. This mixture provided excellent stability at 180° F., but showed significant washouts at 125° F. and 250° F.

D 40/40/20 blend of high softening point uintaite, low softening point uintaite and lignite, treated with Pluronic L-101 surfactant. This mixture provided stability at 180° F, but stability deteriorated significantly at 250° F.

E=A combination of this invention, a 50/25/25 blend of high softening point uintaite, low softening point uintaite and lignite, treated with Pluronic L-101 surfactant. This additive provided superior stability at both low and high temperatures (125° F. and 250° F.)

F=A commercial sulfonated asphalt. This additive showed some stability at 180° F.

=A commercially available surfactant-treated, high softening point (380° F.) uintaite additive. This additive showed some stability at 180° F. with 16% washout.

TABLE III

| Borehole Stability Test Results | | | | |
|---|---|---|---|---|
| Composition | (Fraction) HM:Select: Lignite | Test Temp. °F. | Borehole Size (inches) | Percent Washout |
| A | 0:1:0 | 125 | 1.30 | 4 |
| B | .5:.5:0 | 125 | 1.30 | 4 |
| B | .5:.5:0 | 180 | 1.50 | 20 |
| C | .5:0:.5 | 125 | 1.60 | 28 |
| C | .5:0:.5 | 180 | 1.27 | 2 |
| C | .5:0:.5 | 250 | 1.50 | 20 |
| D | .4:.4:.2 | 180 | 1.30 | 4 |

TABLE III-continued

Borehole Stability Test Results

| Composition | (Fraction) HM:Select: Lignite | Test Temp. °F. | Borehole Size (inches) | Percent Washout |
|---|---|---|---|---|
| D | .4:.4:.2 | 250 | 2.30 | 84 |
| E | .5:.25:.25 | 125 | 1.30 | 4 |
| E | .5:.25:.25 | 250 | 1.30 | 4 |
| F | Sulfonated Asphalt | 180 | 1.40 | 12 |
| G | 1:0:0 | 180 | 1.45 | 16 |

These results clearly show that the combination of this invention, additive E, is superior to the other drilling mud additives tested, performing effectively over a wide temperature range. This additive is superior at both low temperatures and high temperatures when compared to asphalts and additives containing a single softening point uintaite. The continuing good performance of this additive depends on using the fight surfactants, that is those with strong affinities for the unitaite, such as Pluronic L-101.

EXAMPLE 15

Field Trial of the Additive of this Invention

A field trial of the additive of this invention was run on an offshore well in the Gulf of Mexico. The field test was very successful with the well reaching its total depth of 84430, with no problems. After setting surface casing at 4500', the mud system was broken over to a lignite/polymer mud containing 2 lbs/bbl additive. The mud used was a lignite/polymer. No mixing or coalesing problems were observed while adding the additive of this invention to the mud system. Additive concentrations were maintained at 2–2.5 lbs/bbl throughout the drilling of this hole. Mud weights ranged from 9.7 to 10.7 lbs/gallon. Hole angle averaged 21° in this directional well and no excessive torque or drag were experienced.

Caliper logs in the open hole interval 4500'–8400' showed hole washout to average 16%. The sand/shale interval showed no excessive washout within the open hole, except in the last 200 feet when salt was encountered. Offset wells, which utilized commercial uintaite and blown asphalt products, experienced hole washouts of 30–40%. % Washout is calculated by the following formula:

$$\% \text{ Washout} = \frac{D_{hole} - D_{bit}}{D_{bit}} \times 100$$

where $D_{hole}$ is diameter of hole and $D_{bit}$ is the diameter of the drill bit.

Results from this trial are shown in Table IV.

TABLE IV

Field Trial Results[1]

| | Our Additive | Additive Z[2] |
|---|---|---|
| Interval Used (ft.) | 4500–8400 | 4620–9080 |
| Avg. Hole Angle | 21° | 50° |
| Bit Size (in.) | 12¼" | 9⅞" |
| Mud Weight (lbs/gal) | 9.7–10.7 | 9.4–10.1 |
| Additive Conc. (lbs/bbl) | 2.0–2.5 | 2.0–4.0 |
| Total Amount of Additive Used (lbs.) | 6500 | 20,650 |
| Avg. Hole Size from Caliper (in.) | 14.2 | 13.1 |
| % Washout | 16 | 33 |

[1]The well lithology was a mixture of sand and shale.
[2]Additive Z is a combination of two commercially available additives containing uintarte, used sequentially. If recommended, an emulsifier was added during addition.

As can be seen from this table, our invention provided well-bore stability resulting in less washout than the offsetting well which used commercially available uintaite products.

EXAMPLE 16

FSCOT Analysis of Additives

Laboratory-prepared drilling fluid samples containing additives were subjected to hydrocarbon extraction and FSCOT chromatographic analysis to determine if the additives might interfere with the geochemical interpretation of well data through misleading fluorescence data. Hydrocarbons in drilling mud can potentially invade any cores which may be taken. Chromatographic analysis of hydrocarbon extracts of cores can usually distinguish mud additives from native oil, but field examination of invaded cores can show a misleading fluorescence from the mud additives Hydrocarbons from mud additives might also show up in core analysis retorts of invaded cores.

The FSCOT chromatograms of the solvent extract of a drilling mud sample containing our additive showed low levels of hydrocarbons all the way out to the C-40 components. The heavy-end components (C-28 to C-38) show the familiar FSCOT pattern of uintaite. Any surfactant in the sample is generally represented by the lighter hydrocarbons (C-8 to C-20) in the chromatogram.

The FSCOT analysis of our additives qualitatively showed low levels of hydrocarbons (very few peaks over 8mV scale). Relative to the uintaite peaks, the surfactant peaks from our additive were much lower than in a commercial uintaite mud tested in comparison. The chances of the surfactant in this material causing problems with the geochemical analysis of cores should therefore be much less than with the commercial additives.

Having described our invention as related to the specific embodiments laid out above, it is our intention that the invention not be limited by any of the details of description, unless otherwise specified herein. We intend that our invention be broadly construed within the spirit and scope set out in the following claims.

What is claimed is:

1. A method of preparing a water-wettable drilling mud additive comprising the steps of:

mixing together about 2 parts of a high softening point uintaite solid having a softening point of at least 360° F., and about 1 part a low softening point uintaite solid having a softening point of about 330° F. or lower; adding causticized lignite and a strongly lipophilic surfactant.

2. A method as described in claim [11] *1*, wherein said lignite is added while pulverizing the uintaite solids and wherein said surfactant is added by spraying.

3. A water-wettable drilling mud additive that stabilizes a borehole during well drilling, comprising a preblended stabilizing combination of about 2 parts of a high softening point uintaite to about 1 part of a low softening point uintaite, combined with causticized lignite and a strongly lipophilic non-ionic surfactant which provides a rewetting index of less than about 4 to the uintaites, wherein the softening point of said uintaites are about 40° F. apart or greater.

4. A water-wettable drilling mud additive comprising a mixture of:

(a) 45 to 55 percent of a high softening point uintaite having a softening [pint] *point* above about 375° F.;

(b) 20 to 30 percent a low softening point uintaite having a softening point below about 330° F.;

(c) 20 to 30 percent of causticized lignite; and (d) 2 to 4 percent a strongly lipophilic non-ionic surfactant which provides a rewetting index of less than about 4 to the uintaites.

5. A drilling mud additive as described in claim 4, wherein said lipophilic surfactant comprises a block copolymer of ethylene oxide and propylene oxide, and provides a rewetting index of less than about 2 to the uintaites.

6. A drilling mud additive *for stabilizing boreholes during well drilling*, comprising:

a pre-blended, borehole stabilizing mixture of a high softening point uintaite having a softening point of at least 360° F., a low softening point uintaite having a softening point of about 330° F. or lower, causticized lignite, and a surfactant that provides the uintaites with a rewetting index of less than about 4, wherein the ratio of said high softening point uintaite to said low softening point uintaite is about 2 to 1.

7. A drilling mud additive as described in claim 6, wherein said surfactant provides the uintaites with a rewetting index of less than about 2.

8. A drilling mud additive as described in claim 6, wherein said surfactant is a highly lipophilic non-ionic surfactant comprising a block copolymer of ethylene oxide and propylene oxide.

9. A drilling mud additive as described in claim 6, wherein the weight ratio of said high softening point uintaite to said low softening point uintaite to said causticized lignite is about 2 to about 1 to about 1.

10. A drilling mud additive as described in claim 6, wherein said high softening point uintaite has a softening point above about 375° F.

11. A drilling mud additive as described in claim 10, wherein the softening points of the two uintaites are at least 40° F. apart.

12. A drilling mud additive as described in claim 6, wherein said low softening point uintaite has a softening point of from 290 to 330° F[and said additive is storage stable].

13. A drilling mud additive as described in claim 12, wherein said high softening point uintaite has a softening point above about 375° F.

14. A water-wettable drilling mud additive that stabilizes a borehole during well drilling, comprising a preblended stabilizing combination of a high softening point uintaite, having a softening point of at least 360° F., a low softening point uintaite having a softening point of about 330° F. or lower, causticized lignite, and a strongly lipophilic non-ionic surfactant which provides a rewetting index of less than about 4 to the uintaites, wherein the ratio of said high softening point uintaite to said low softening point uintaite is about 2 to 1.

15. A water-wettable drilling mud additive as described in claim 14 comprising about 2 parts by weight of said high softening point uintaite, about 1 part by weight of said low softening point uintaite, and about 1 part by weight of said causticized lignite.

16. A drilling mud additive as described in claim 14, wherein said non-ionic surfactant comprises a block copolymer of ethylene oxide and propylene oxide, and provides a rewetting index of less than about 2 to the uintaites.

17. A drilling mud additive as described in claim 14, wherein the amount of said non-ionic surfactant is 1 to 5 wt. % of said additive.

18. A drilling mud additive [ass] *as* described in [claimed] *claim* 14[;] wherein said high softening point uintaite has a softening point above about 375° F.

19. A drilling mud additive as described in claim 14, wherein the softening points of the uintaites are about 50° F. apart, or greater.

20. A drilling mud additive as described in claim 14, wherein said low softening point uintaite has a softening point of from 290° to 330° F[and said additive is storage stable].

21. A drilling mud additive as described in claim 20, wherein said high softening point uintaite has a softening point above about 375° F.

22. A water based drilling fluid containing the additive of claim 14 or 4 or 6 or 3.

23. A method of decreasing shale sloughing and borehole instability, comprising the step of:

incorporating the additive of claim 14 or 4 or [5] *6* into a water-based drilling fluid at a rate of about 2 [roo] *to* 6 lbs. of additive per barrel of drilling fluid.

24. A method of drilling a well, comprising the steps of inserting a drill bit into the well and circulating a drilling mud comprising the additive of claim 14 or 4 or 6.

25. A method of drilling a well [las] *as* described in claim 24, wherein the bottom hole temperature of said well ranges from ambient up to 400° F.

26. A method of drilling a well as described in claim 24, wherein the bottom hole temperature of said well ranges from ambient to about 300° F.

*27. A method of preparing a water-wettable drilling mud additive comprising the steps of:*

*mixing together a high softening point uintaite solid having a softening point of at least 360° F., and a low softening point uintaite solid having a softening point of about 330° F. or lower; and adding causticized lignite and a surfactant effective to decrease the rewetting index of the uintaites, wherein the weight ratio of said uintaites to said causticized lignite is between about 3:1 to about 4:1.*

*28. A method as described in claim 27, wherein said lignite and surfactant are added concurrently while pulverizing said uintaite solids.*

*29. A method as described in claim 27, wherein said lignite is added while pulverizing the uintaite solids and prior to the addition of the surfactant.*

*30. A method as described in claim 27, wherein said surfactant is added prior to the addition of said lignite.*

*31. A method as described in claim 27, wherein said solids are pulverized such that no more than about 20* of said solids are greater than about 200 mesh.

*32. A water-wettable drilling mud additive that stabilizes a borehole during well drilling, comprising a preblended stabilizing combination of a high softening point uintaite and a low softening point uintaite, combined with a causticized lignite and a surfactant effective to decrease the*

*rewetting index of the uintaites, wherein the softening point of said uintaites are about 40° F. apart or greater and wherein the weight ratio of uintaites to said causticized lignite is about between about 3:1 to about 4:1.*

*33. An additive as described in claim 32, wherein the additive stabilizes boreholes over a temperature range of at least 125° F to 250° F.*

*34. A drilling mud additive as described in claim 32, wherein said surfactant comprises a block copolymer of ethylene oxide and propylene oxide.*

*35. The drilling mud additive of claim 32, wherein said surfactant provides the uintaites a rewetting index of less than about 4.*

*36. The drilling mud additive of claim 35, wherein said surfactant provides the uintaites with a rewetting index of less than about 2.*

*37. A drilling mud additive for stabilizing boreholes during well drilling, comprising:*

*a pre-blended, borehole stabilizing mixture of a high softening point uintaite having a softening point of at least 360° F., a low softening point uintaite having a softening point of about 330° F. or lower, causticized lignite, and a surfactant effective to decrease the rewetting index of the uintaites, wherein the weight ratio of uintaites to said causticized lignite is between about 3:1 to about 4:1.*

*38. A drilling mud additive as described in claim 37, wherein said surfactant provides the uintaites with a rewetting index of less than about 4.*

*39. A drilling mud additive as described in claim 38, wherein said surfactant provides the uintaites with a rewetting index of less than about 2.*

*40. A drilling mud additive as described in claim 37, wherein said surfactant is a strongly lipophilic non-ionic surfactant comprising a block copolymer of ethylene oxide and propylene oxide.*

*41. A drilling mud additive as described in claim 37, wherein said low softening point uintaite has softening point of from 290° to 330° F.*

*42. A drilling mud additive as described in claim 41, wherein said high softening point uintaite has a softening point above about 375° F.*

*43. A drilling mud additive as described in claim 41, wherein the amount of said surfactant is 1 to 5 wt.* of said additive.

*44. A drilling mud additive as described in claim 37, wherein said high softening point uintaite has a softening point above about 375° F.*

*45. An additive as described in claim 37, wherein the additive stabilizes boreholes over a temperature range of at least 125° F to 250° F.*

*46. A method of preparing a water-wettable drilling mud additive comprising the steps of:*

*a) mixing together about a high softening point uintaite solid having a softening point of at least 360° F., a low softening point uintaite solid having a softening point of about 330° F. or lower;*

*b) melting the mixture of step a;*

*c) dissolving or trapping a surfactant effective to decrease the rewetting index of the uintaites in the molten mixture of step b;*

*d) solidifying the mixture of step c;*

*e) pulverizing the mixture of step d; and*

*f) adding causticized lignite, wherein the weight ratio or uintaites to said causticized lignite is between about 3:1 to about 4:1.*

*47. A water-wettable additive for water-based drilling fluids that stabilizes a borehole during well drilling, comprising a pre-blended stabilizing combination including causticized lignite, a high softening point uintaite, an amount of low softening point uintaite effective to stabilize boreholes over a temperature range of between about 125° F to about 250° F, and a surfactant effective to decrease the rewetting index of the uintaites.*

*48. The additive of claim 47, further including an intermediate softening point uintaite.*

*49. The additive of claim 47, wherein said surfactant provides said uintaites a rewetting index of less than about 4.*

*50. The additive of claim 47, wherein the weight ratio of said high softening point uintaite to said low softening point uintaite is between about 1:1 and about 4:1.*

*51. The additive of claim 50, wherein said weight ratio is between about 3:1 and about 4:1.*

*52. The additive of claim 47, wherein said temperature range is between about 125° F and 450° F.*

*53. The additive of claim 47, wherein said surfactant is strongly lipophilic.*

*54. A drilling mud additive for stabilizing boreholes during well drilling, comprising a pre-blended borehole stabilizing mixture of causticized lignite, a high softening point uintaite, an amount of low softening point uintaite effective to stabilize boreholes over a temperature range of between about 125° F, and about 250° F, and a surfactant which is effective to decrease the rewetting index of the uintaites.*

*55. The additive of claim 54, wherein said surfactant is strongly lipophilic.*

*56. The additive of claim 54, wherein said temperature range is between about 125° F and 450° F.*

*57. A method of preparing a water-wettable drilling mud additive for stabilizing boreholes during well drilling, comprising the steps of mixing a high softening point uintaite with an amount of low softening point uintaite effective to stabilize boreholes over a temperature range of between about 125° F and 250° F, and adding causticized lignite and a surfactant effective to decrease the rewetting index of the uintaites.*

*58. The method of claim 57, wherein said surfactant is a strongly lipophilic non-ionic surfactant.*

*59. The method of claim 57, wherein said temperature range is between about 125° F and 450° F.*

*60. A water-based drilling fluid containing the additive of claim 32, or 37, or 47, or 54.*

*61. A method of decreasing shale sloughing and borehole instability, comprising the step of:*

*incorporating the additive of claim 32, or 37, or 47, or 54 into a water-based drilling fluid at a rate of about 2 to 6 lbs of additive per barrel of drilling fluid.*

*62. A method of drilling a well, comprising the steps of inserting a drill bit into the well and circulating a drilling mud comprising the additive of claim 32, or 37, or 47 or 54.*

*63. A method of drilling a well, comprising the steps of inserting a drill bit into the well to form a bore-hole and circulating a drilling mud into said bore-hole and through said well during said drilling, said drilling mud containing a water-wettable additive for water-based drilling fluids that stabilizes a borehole during well drilling, said additive including a pre-blended stabilizing combination including a high softening point uintaite, an amount of low softening point uintaite effective to stabilize boreholes at a temperature above about 125° F, and a surfactant effective to*

*decrease the rewetting index of the uintaites, said additive being effective to substantially reduce sloughing shales and bore-hole erosion to thereby reduce bore-hole collapse, while increasing bore-hole lubrication.*

*64. The method of claims 57 or 63, wherein the softening points of said high softening point uintaite and said low softening point uintaite are at least about* 40° *F apart.*

*65. The method of claims 57 or 63, wherein said high softening point uintaite has a softening point of at least* 360° *F and said low softening point uintaite has s softening point of about* 330° *F or lower.*

*66. The method of claims 57 or 63, wherein said low softening point uintaite has a softening point of between about* 290° *F and about* 330° *F.*

* * * * *